United States Patent
Mahoney et al.

[11] Patent Number: 5,950,778
[45] Date of Patent: Sep. 14, 1999

[54] VIBRATION ISOLATION DRIVE COUPLING

[75] Inventors: Gregory P. Mahoney, Victor; Michael H. Green; Christopher B. Liston, both of Rochester, all of N.Y.

[73] Assignee: Eastman Kodak Company, Rochester, N.Y.

[21] Appl. No.: 08/742,790

[22] Filed: Oct. 31, 1996

[51] Int. Cl.[6] .................................................. F16D 3/64
[52] U.S. Cl. ................................................ 188/378; 464/83
[58] Field of Search ................................. 188/378, 379, 188/386; 464/83, 85

[56] References Cited

U.S. PATENT DOCUMENTS

| | | | |
|---|---|---|---|
| 2,720,764 | 10/1955 | Landrum | 464/83 |
| 3,386,266 | 6/1968 | Grumblatt | 464/83 |
| 3,427,827 | 2/1969 | Airheart | 464/83 |
| 3,605,439 | 9/1971 | Filepp | 64/9 R |
| 3,815,380 | 6/1974 | Esmay | 64/4 |
| 4,179,112 | 12/1979 | Breuers et al. | 271/3 |
| 4,184,090 | 1/1980 | Taiani et al. | 310/104 |
| 4,401,208 | 8/1983 | Allmacher, Jr. | 198/781 |
| 4,787,878 | 11/1988 | Nikkel | 464/83 |
| 5,070,366 | 12/1991 | Tsuchiya | 355/219 |
| 5,081,488 | 1/1992 | Suzuki | 355/200 |
| 5,294,968 | 3/1994 | Ueda et al. | 355/245 |
| 5,474,499 | 12/1995 | Olson | 464/83 |

Primary Examiner—Matthew C. Graham
Attorney, Agent, or Firm—Lawrence P. Kessler

[57] ABSTRACT

An isolation coupling which provides for isolation of torsional vibration, from a drive component to a drive component, such as a driven shaft, due to non-constant drive forces. The vibration isolation coupling includes a drive assembly connected to the drive component, and a driven assembly connected to the driven component. The drive assembly and the driven assembly are axially aligned, such as being mounted on the shaft of the drive component for example. A member, having torsional compliability, interconnects the drive assembly to the driven assembly. Accordingly, vibrations imparted to the drive assembly are isolated from the driven assembly by such torsional compliability of the member.

13 Claims, 3 Drawing Sheets

VIBRATION ISOLATION DRIVE COUPLING

BACKGROUND OF THE INVENTION

The present invention relates in general to couplings in a drive system, and more particularly to a drive system coupling which provides for isolation of torsional vibration due to non-constant drive forces.

In many mechanical devices it is necessary to drive a plurality of components from a single drive source such as a motor. This may be readily accomplished by interconnecting the various components and the motor through a drive belt or chain arrangements. The drive belt or chain engages a drive shaft of the motor through a gear or pulley. Likewise, through similar gear or pulleys, the drive belt or chain engages appropriate driven shafts for each of the various plurality of components. In order to assure that the drive belt functions properly, it must engage the various gears or pulleys with sufficient forces to prevent slipping or jumping.

Due to the described arrangement, forces on the drive shafts act both in the torsional direction to cause rotation of the shaft and in the radial direction to assure engagement with the drive chain is maintained. While the drive motor is running, as well as when it starts and stops, the torsional force on the driven shaft may not be constant and, as such, may cause undue vibration to be transmitted to the driven shaft. This vibration is transmitted to the component associated with the driven shaft, and may adversely effect operation of such component.

It is well known to provide an isolation member in the drive system to prevent the transmission of such vibration to any particular driven component. Typically, the isolation member is a flexible coupling between the driven shaft and the gear or pulley with which the drive chain or belt is associated. Such flexible coupling may be a spring or resilient member, such as rubber for example, located radially between the driven shaft and the gear or pulley with which the drive chain or belt is associated. While such isolation members provide the desired isolation of undue vibration to the particular component, through the driven shaft, they have an adverse effect on the radial forces required to maintain drive engagement between the drive belt and the driven shafts. That is, the isolation members may flex in the radial direction to the extent that the drive belt is no longer effective to act on the gear or pulley. Moreover, the radial force may result in an eccentricity of the drive coupling between the gear or pulley and the respective driven shaft.

SUMMARY OF THE INVENTION

In view of the foregoing discussion, this invention is directed to an isolation coupling which provides for isolation of torsional vibration, from a drive component to a driven component, such as a driven shaft, due to non-constant drive forces. The vibration isolation coupling includes a drive assembly connected to the drive component, and a driven assembly are axially connected to the driven component. The drive assembly and the driven assembly are axially aligned, such as being mounted on the shaft of the driven component for example. A member, having torsional compliability, interconnects the drive assembly to the driven assembly. Accordingly, vibrations imparted to the drive assembly are isolated from the driven assembly by such torsional compliability of the member.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DETAILED DESCRIPTION OF THE INVENTION

Figure 1:
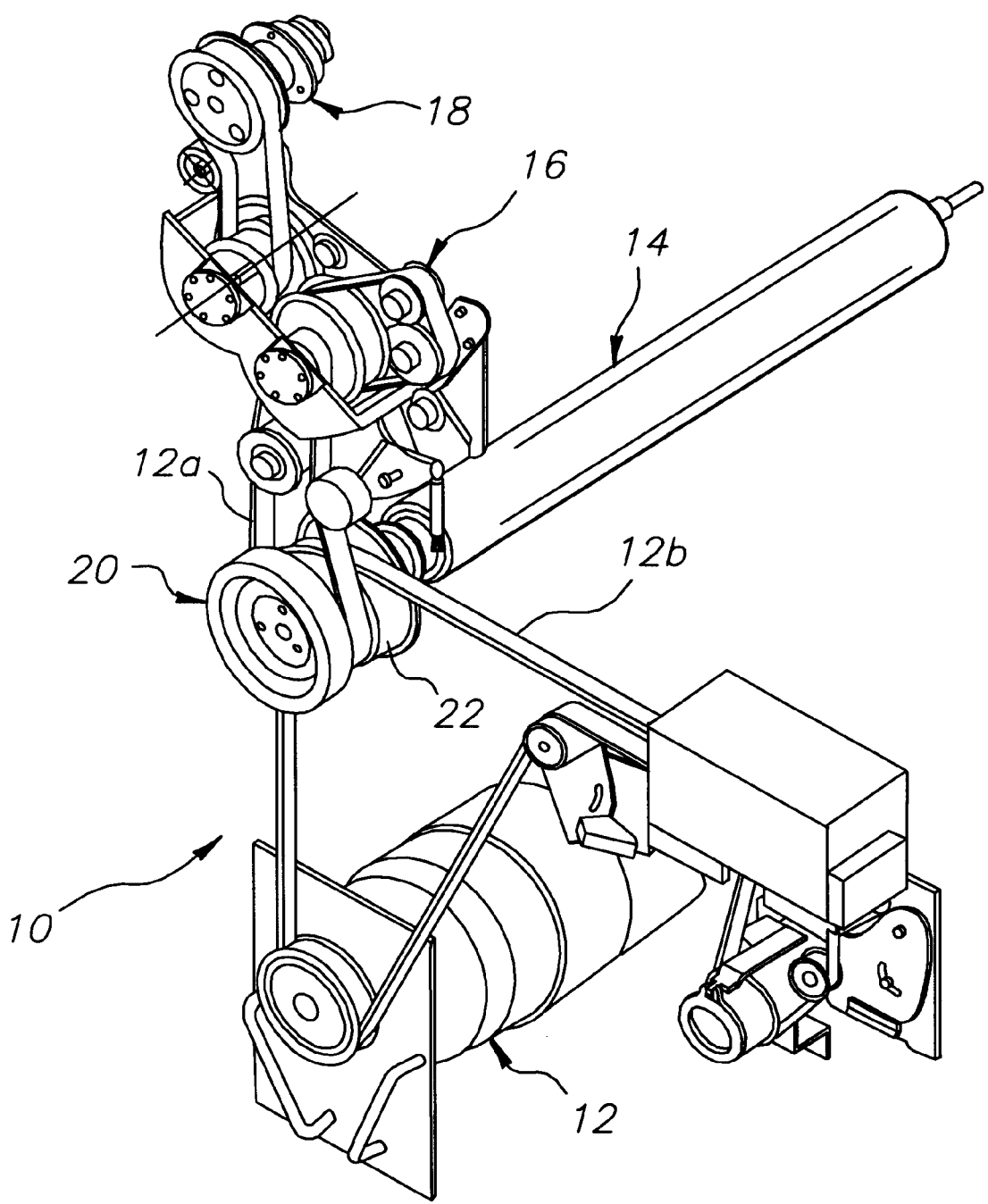
FIG. 1 is view, in perspective, of an exemplary drive system, where a main drive motor is provided to drive a plurality of components, such drive system utilizing the vibration isolation coupling according to this invention.

Referring now to the accompanying drawings, FIG. 1 shows an exemplary drive system, designated generally by the numeral 10. In the drive system 10, a drive component, such as a main drive motor 12, is provided to drive a plurality of driven components 14–18. The driven components of the exemplary drive system are elements of a reproduction apparatus including a support roller (component designated by numeral 14) for an image-bearing web (not shown). In certain instances, it is necessary for any vibrations in the drive system to be isolated from the driven components in order that the driven components function properly. That is, the driven components must not be adversely effected in their operation due to vibrations transmitted thereto. For example, the image-bearing web support roller must be prevented from vibrating so that an accurate exposure of an image (picture element-for-picture element) to be reproduced is formed on the web. Accordingly, the drive system 10 utilizes the vibration isolation coupling, designated generally by the numeral 20, according to this invention.

Figure 2:
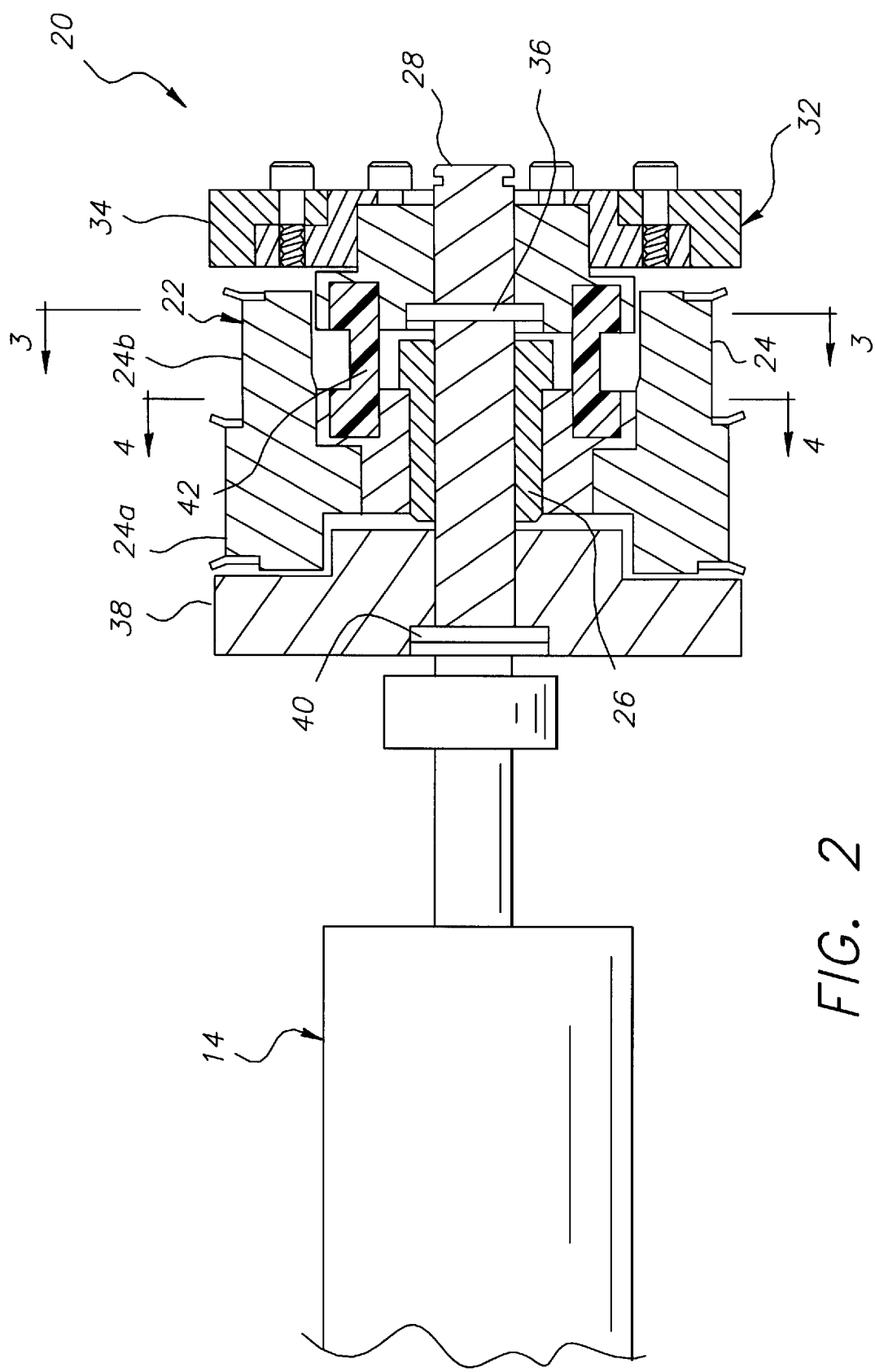
FIG. 2 is a side elevational view, in cross-section and on an enlarged scale, of the vibration isolation coupling according to this invention.

The vibration isolation coupling 20, best shown in detail in FIG. 2, includes a drive assembly 22, a driven assembly 32, and a torsionally complaint member 42 for interconnecting the drive assembly and the driven assembly. The drive assembly 22 includes a pulley 24, or the like, supported by a sleeve bearing 26 mounted on a shaft 28. As such, the pulley 24 is located at a fixed radius from the longitudinal axis of the shaft 28 and is rotatable about the longitudinal axis of the shaft relative to the shaft. The shaft 28 extends from, and supports, the driven component 14 (i.e., the image-bearing web support roller). As shown, the pulley 24 is a compound structure having a pair of circumferential surfaces 24a, 24b, of preselected diameters. Drive belts 12a, 12b, entrained about the surfaces 24a, 24b, are respectively associated with the motor 12 and another driven component 16 (see FIG. 1). Of course, gears and drive chains may be utilized in place of pulleys and belts, and are suitable for use with this invention.

The driven component 14 includes a driven assembly 32 includes a fly wheel 34 supported on the shaft 28 and fixed to the shaft, such as by a pin 36. As such, the fly wheel 34 is located at a fixed radius from the longitudinal axis of the shaft 28 and is rotatable with the shaft. The drive assembly may also include a second fly wheel 38. The second fly wheel 38 is supported on the shaft 28 and fixed to the shaft, such as by a pin 40. As such, the fly wheel 38 is also located at a fixed radius from the longitudinal axis of the shaft 28 and is rotatable with the shaft. The fly wheel(s) is for the purpose of smoothing out the rotational velocity of the shaft so as to dampen any vibrations in the drive system 10. Further, the mounting of the drive assembly 22 and the driven assembly 32 on the shaft 28 serves to axially align the drive assembly and the driven assembly.

Figure 3:
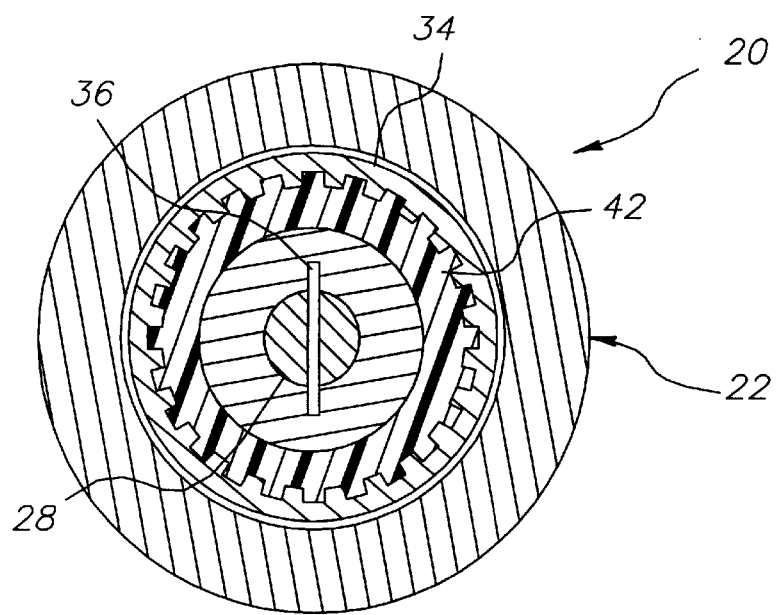
FIG. 3 is an end elevational view of the vibration isolation coupling as shown in FIG. 2, in cross-section taken along the lines 3—3 of FIG. 2.
Figure 4:
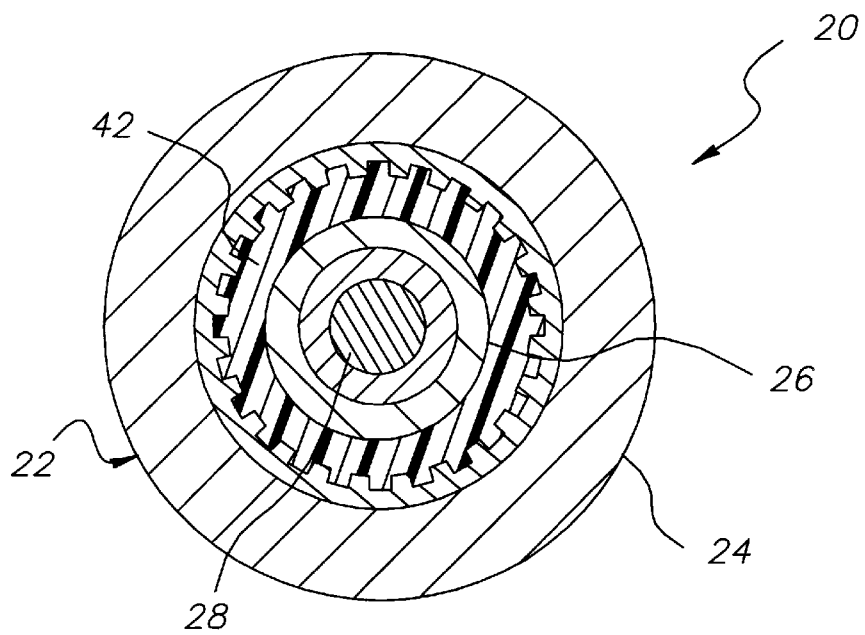
FIG. 4 is an end elevational view of the vibration isolation coupling as shown in FIG. 2, in cross-section taken along the lines 4—4 of FIG. 2.

The torsionally compliant member 42 for connecting the drive assembly 22 and the driven assembly 32 is a sleeve 44 joined in any suitable manner to the drive assembly and driven assembly adjacent to the respective ends of the sleeve. For example, the sleeve 44 may have circumferential splined configurations 44a, 44b, at the ends which are received in complimentary shaped receptacles in the drive assembly and the driven assembly (see FIGS. 3 and 4). Of course other suitable connecting devices of any well known type may be used with this invention.

The Sleeve 44 of the compliant member 42 is formed of rubber, such as EPDM (ethylene-propylene terpolymer) or Neoprene for example, and has a torsional stiffness of approximately 229 in-lb/radian. As such, the torsional compliability of the member 42, in conjunction with the action of fly wheel(s), enables any vibrations in the drive system from the drive component end to be isolated from the driven assembly. In this manner the driven components may function in a manner so as not to be adversely effected by drive component vibrations. Further, the fixed radial location of the drive assembly 22 and the driven assembly 32 on the shaft 28 maintain the relative radial position of the drive and driven assemblies (that is to say, in axial alignment) so as to maintain drive engagement between the drive belts (12a, 12b) and the driven shaft (28), and prevent eccentricity in the drive coupling.

The invention has been described in detail with particular reference to preferred embodiment thereof, but it will be understood that variations and modifications can be effected within the spirit and scope of the invention as set forth in the claims.

What is claimed is:

1. An isolation coupling providing isolation of torsional vibration, from a drive component to a drive component, due to non-constant drive forces, said vibration isolation coupling comprising;
   a drive assembly connected to said drive component;
   a driven assembly connected to said driven component, said driven assembly being axially aligned with and spaced in an axial direction from said drive assembly; and
   a member, located in such axial space between said driven assembly and said drive assembly, having torsional compliability, axially interconnecting said drive assembly and said driven assembly, whereby vibrations imparted to said drive assembly are isolated from said driven assembly by such torsional compliability of said member.

2. The vibration isolation coupling of claim 1 wherein said drive assembly includes a pulley arrangement connected to said drive component by a drive belt.

3. The vibration isolation coupling of claim 1 wherein said driven assembly includes a fly wheel mounted on, and connected to, a shaft supporting said driven component.

4. The vibration isolation coupling of claim 1 wherein said driven assembly includes a fly wheel mounted on, and connected to, a shaft supporting said driven component, and said drive assembly includes a pulley arrangement, connected to said drive component by a drive belt.

5. The vibration isolation coupling of claim 4 wherein said pulley arrangement is mounted on said driven component supporting shaft, for relative rotation with said shaft, in axial alignment with said fly wheel of said driven assembly.

6. The vibration isolation coupling of claim 5 wherein said torsionally compliable member is a sleeve surrounding said driven component supporting shaft spaced from the longitudinal axis thereof, said sleeve being connected at the respective ends to said pulley arrangement and said fly wheel.

7. An isolation coupling providing isolation of torsional vibration, to a shaft of a driven component, due to non-constant drive forces of a drive component, said vibration isolation coupling comprising;
   a drive assembly mounted on said shaft for relative rotation with respect to said shaft;
   a driven assembly mounted on said shaft for rotation with said shaft, said driven assembly being axially aligned with and spaced in an axial direction from said drive assembly; and
   a member, located in such axial space between said driven assembly and said drive assembly, having torsional compliability, axially interconnecting said drive assembly and said driven assembly, whereby vibrations imparted to said drive assembly are isolated from said driven assembly by such torsional compliability of said member.

8. The vibration isolation coupling of claim 7 wherein said driven assembly includes a fly wheel mounted on, and connected to, said shaft.

9. The vibration isolation coupling of claim 7 wherein said driven assembly includes a fly wheel mounted on, and connected to, said shaft, and said drive assembly includes a pulley arrangement, connected to said drive component by a drive belt.

10. The vibration isolation coupling of claim 9 wherein said pulley arrangement is mounted on said shaft, for relative rotation with said shaft, in axial alignment with said fly wheel of said driven assembly.

11. The vibration isolation coupling of claim 10 wherein said torsionally compliable member is a sleeve surrounding said shaft spaced from the longitudinal axis thereof, said sleeve being connected at the respective ends to said pulley arrangement and said fly wheel.

12. An isolation coupling providing isolation of torsional vibration to a shaft of an image-bearing web support roller from a drive motor, due to non-constant drive forces of said drive motor, said vibration isolation coupling comprising;
   a pulley arrangement, mounted on said web support roller shaft for relative rotation with respect to said shaft;
   a fly wheel mounted on said web support roller shaft for rotation with said web support roller shaft, said fly wheel being axially aligned with and spaced from said pulley arrangement; and
   a member, having torsional compliability, axially interconnecting said pulley arrangement and said fly wheel, whereby vibrations imparted to said pulley arrangement by said drive motor are isolated from said fly wheel, and thus said web support roller, by such torsional compliability of said member.

13. The vibration isolation coupling of claim 12 wherein said torsionally compliable member is a sleeve surrounding said shaft spaced from the longitudinal axis thereof, said sleeve being connected at the respective ends to said pulley arrangement and said fly wheel.

* * * * *